INVENTORS
ELVIN E. EAST
JOHN E. SIMS
THOMAS A. ELLIOTT
BY Newton, Hopkins, Jones & Ormsby
ATTORNEYS May 5, 1970 E. E. EAST ET AL 3,510,056

DATA RECORDING DEVICE

Filed Oct. 2, 1967 4 Sheets-Sheet 2

INVENTORS
ELVIN E. EAST
JOHN E. SIMS
THOMAS A. ELLIOTT
BY Newton, Hopkins, Jones & Ormsby
ATTORNEYS INVENTORS
ELVIN E. EAST
JOHN E. SIMS
THOMAS A. ELLIOTT
BY Newton, Hopkins, Jones & Ormsby
ATTORNEYS May 5, 1970 E. E. EAST ET AL 3,510,056

DATA RECORDING DEVICE

Filed Oct. 2, 1967 4 Sheets-Sheet 4

INVENTORS
ELVIN E. EAST
JOHN E. SIMS
THOMAS A. ELLIOTT
BY Newton, Hopkins, Jones & Ormsby
ATTORNEYS 3,510,056
Patented May 5, 1970

3,510,056

DATA RECORDING DEVICE

Elvin E. East, Cordele, John E. Sims, Tucker, and Thomas A. Elliott, Atlanta, Ga., assignors, by direct and mesne assignments, to Source Data Automation, Inc., Cordele, Ga., a corporation of Georgia Filed Oct. 2, 1967, Ser. No. 672,376
Int. Cl. G06k *1/08, 1/16, 7/04*
U.S. Cl. 234—45 22 Claims

ABSTRACT OF THE DISCLOSURE

What is disclosed herein is a data recording device for recording data from a plurality of different data sources each providing data input to the device in a different input mode. As disclosed, the device includes a recording means and a transducing means for converting data input in any of a plurality of input modes into data output in a single output mode to which the recording means is responsive. The transducing means includes a plurality of pegs movable between operative and inoperative positions and the single output mode of the transducing means is defined by the pegs in operative positions. Since only a small amount of force is required to move a peg from inoperative to operative position, data input to the transducing means may be from any data source such as a perforated card, an adding machine, push buttons, a rotary member, or horizontal sliders which provides data input in an input mode suitable to position a peg. Data input to the transducing means from a variety of data sources is described herein.

BACKGROUND OF THE INVENTION

Field of the invention

The invention disclosed herein relates to the recording of data for subsequent processing by computer and related techniques and more particularly to a data recording device for recording data provided from any one or more of a variety of data sources.

Description of the prior art

There is a continuing and growing need in the data processing art for data recording devices with which to record data for subsequent processing by computer and related techniques. Most prior art data recording devices are highly specialized as to the input mode by which data input is permitted or are highly complicated and difficult to maintain if provision is made for several different input modes. Moreover, if data input is by an input mode defined by only a relatively small amount of force, prior art data recording devices have generally required relatively expensive transducers to convert the force available from the data input into that substantial force required to achieve the punching of punch cards and other data recording operations.

SUMMARY OF THE INVENTION

The data recording device disclosed herein is a data recording device which provides for data input from one or more of a variety of data sources in any one or more of a variety of input modes which may be defined by forces of various magnitudes and by various motions. Moreover, data input to the data recording device may be in only one input mode or simultaneously in a plurality of input modes. However, whether data input is in one input mode or simultaneously in a plurality of input modes, the data recording device accurately records the data and is relatively simple, easy to maintain and inexpensive.

These improvements in a data recording device are provided by a data recording device which includes a transducing means for converting data inputs in one or more input modes from one or more data sources into a data output in a single output mode, and a recording means for recording data in response to the data output of the transducing means. In the embodiment of the invention disclosed, the recording means is a punching means which is generally conventional in that it includes a plurality of punch bars slideably positionable relative to a plurality of punches which serve to punch a punch card at locations determined by the positions of the punch bars.

The transducing means includes a plurality of pegs that have operative and inoperative positions between which they are moved by relatively small amounts of force and that in their operative positions engage and position the punch bars. The transducing means provides for data input by a simple input mode defined by manually depressing a peg or by any of a variety of more complicated input modes defined by a motion and a force which are together sufficient to depress a peg. However, regardless of the input mode of the data input to the transducing means, the data recording device disclosed herein and including the punching means and the transducing means having a plurality of easily positionable pegs provides a simple, easy to maintain and inexpensive data recording device.

BRIEF DESCRIPTION OF THE DRAWING

These and other features and advantages of the invention will be more clearly understood from the following detailed description and the accompanying drawing in which like characters of reference designate corresponding parts throughout and in which.

DESCRIPTION OF EMBODIMENTS

The foregoing described figures and following detailed description disclose several embodiments of the invention. However, it should be understood that the invention is not limited to the embodiments disclosed herein since it may be embodied in other equivalent forms.

The invention disclosed herein in best understod as including a transducing means T for converting data input in one or more of a plurality of input modes into data output in a single output mode and a recording means such as a punching means P responsive to data output in the single output mode of the transducing means for recording data. The invention disclosed herein is most easily understood by initially considering the punching means P since it is substantially conventional.

PUNCHING MEANS

Figure 1:
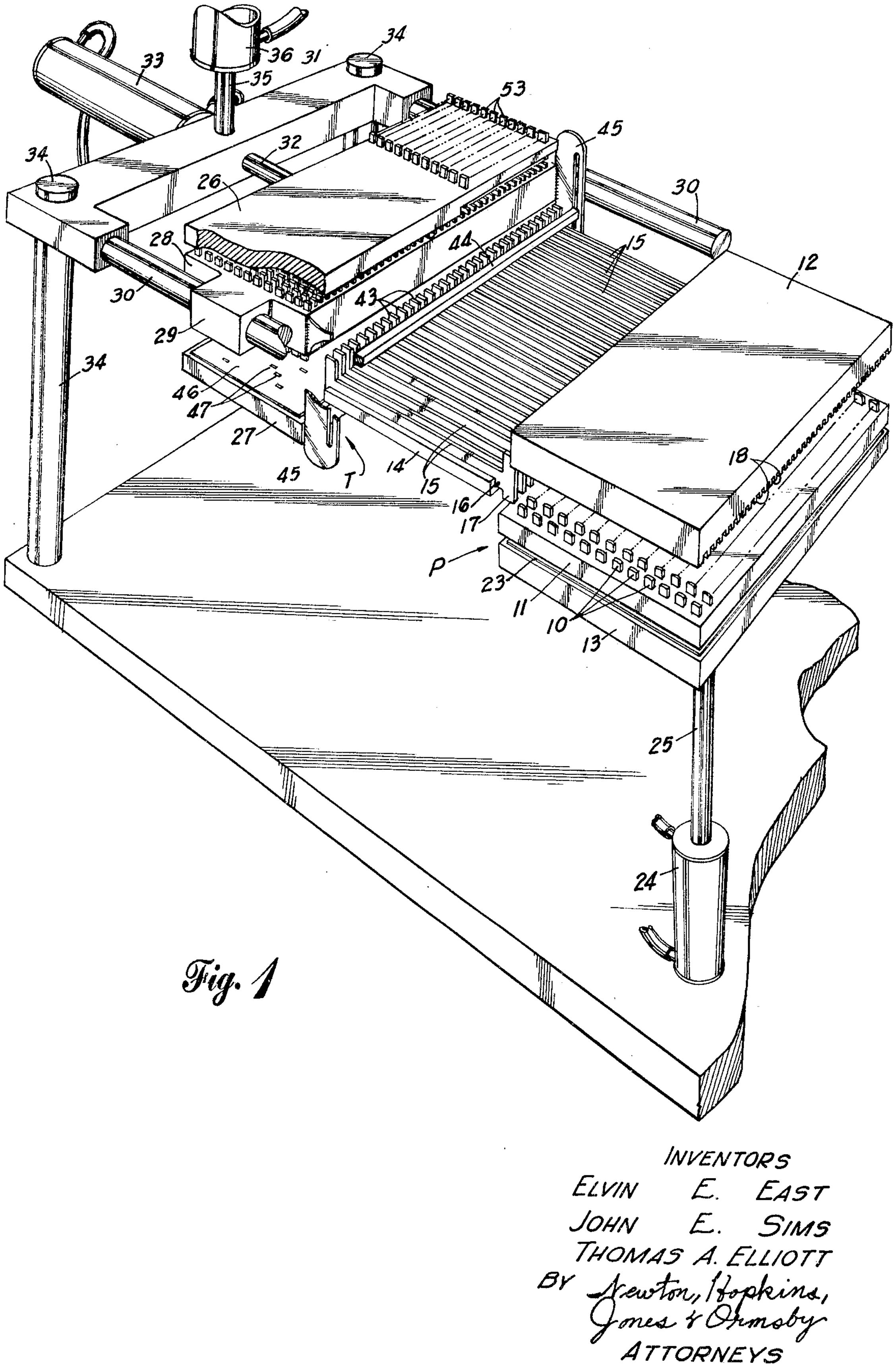
FIG. 1 is a perspective view of a data recording device embodying the invention disclosed herein with structural details unnecessary to an understanding of the invention omitted for clarity.
Figure 2:
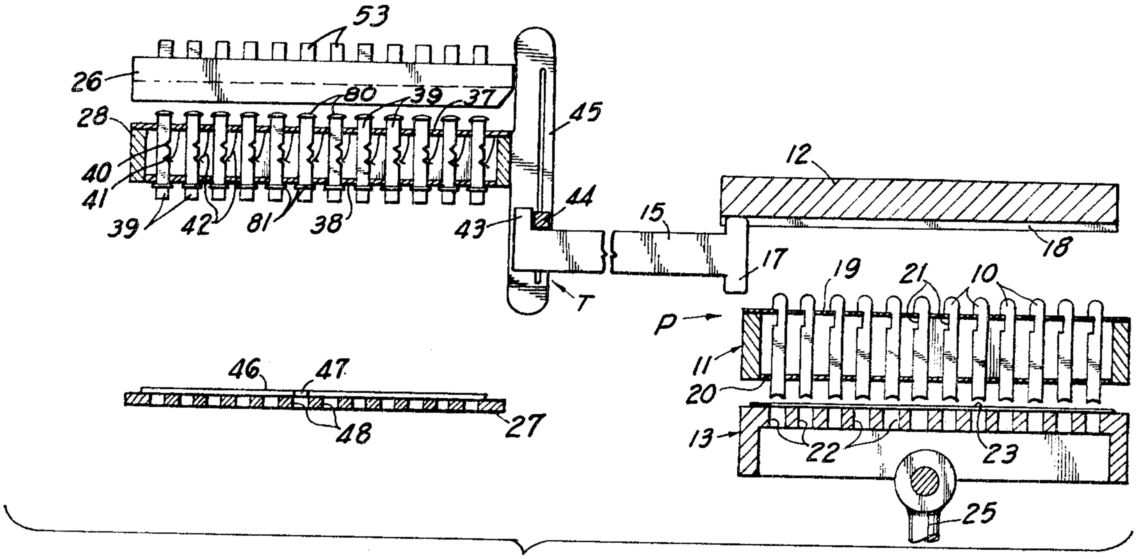
FIG. 2 is a cross-sectional view through that embodiment of the invention shown in FIG. 1 with certain structural details shown in FIG. 1 omitted for clarity.

The punching means P is best shown by FIGS. 1 and 2 from which it will be seen that the punching means P includes a plurality of punches 10 positioned within a stationary punch plate 11, a stationary head 12 positioned above the punch plate 11, and a vertically movable card tray 13 positioned below the punch plate 11. The card tray 13 is vertically movable relative to the punch plate 11 by controlling fluid pressure in conventional manner in a fluid cylinder 24 so as to extend and retract a piston 25 having its extending end attached to the card tray 13.

A stationary punch bar tray 14 is positioned adjacent the punch plate 11 and a plurality of punch bars 15 are slidably positioned within slots 16 in the punch bar tray 14. Each of the punch bars 15 has a hammer 17 formed at that end adjacent the punch plate 11. The punch bars 15 are slidably movable relative to the punch plate 11 so that the downwardly extending lower end of each of the hammers 17 is moved in sequence just above the punches 10 in a column of punches 10. The upper end of each hammer 17 is in a guide slot 18 in the stationary head 12 and the stationary head 12 serves to prevent substantial upward motion of the hammers 17.

As best seen in FIG. 2, the punches 10 extend through an upper member 19 and a lower member 20 of the punch plate 11 and the free vertical movement of each punch 10 is restricted only by the upper member 19 extending into a recess 21 in the side of the punch 10. Thus, it will be understood that the punches 10 are urged downwardly by gravity within the punch plate 11 and that each punch 10 may be moved upwardly a distance determined by the length of the recess 21 in its side unless upward motion to the punch 10 is prevented by a hammer 17.

The card tray 13 has a plurality of punch channels 22 corresponding in their positions to the positions of the punches 10 in the punch plate 11. Thus, with upward motion of the card tray 13 relative to the punch plate 11, each of the punches 10 enters a punch channel 22 and is not urged upwardly by motion of the card tray 13. However, when a punch card 23 is placed upon the card tray 13 beneath the punches 10, the punch card 23 engages the lower ends of the punches 10 and those punches 10 above which a hammer 17 is not positioned are moved upwardly within the punch plate 11 by the punch card 23 while those punches 10 above which a hammer 17 is positioned are forced through the punch card 23 and into a punch channel 22. When a punch 10 is forced through a punch card 23, a hole (not shown) is formed in the punch card 23 in a position corresponding to the position of a hammer 17.

Since the positions of the hammers 17 over the punches 10 are determined by the positions of the punch bars 15, the pattern of holes required to record data in a punch card 23 in conventional manner is easily and conveniently provided by positioning of the punch bars 15 and the data is directly related to the relative positions of the punch bars 15. From the foregoing description, those skilled in the art will recognize that the punching means P is generally conventional and it is for this reason that many structural details have been omitted from the drawing and from the description of the punching means P.

TRANSDUCING MEANS

As already indicated above, it is the transducing means T which converts data in one or more of a plurality of input modes into data in a single output mode suitable for positioning the plurality of punch bars 15 of the punching means P or for otherwise actuating a recording means. From FIGS. 1 and 2, it will be seen that the transducing means T includes a stationary upper plate 26 and a stationary lower plate 27 which are mounted in conventional manner to a structural member (not shown) so as to be substantially horizontal and so that the upper plate 26 is spaced from and substantially co-extensive with the lower plate 27. A peg plate 28 is mounted for substantially vertical motion between the upper plate 26 and the lower plate 27 and for substantially horizontal motion from between the upper plate 26 and the lower plate 27 toward the punch bars 15.

In that embodiment of the invention disclosed herein, horizontal motion of the peg plate 28 is provided by mounting the peg plate 28 between bearing blocks 29 (only one of which is shown) which are slideably movable on rods 30 that extend substantially parallel to each other from a yoke 31. Horizontal motion of the blocks 29 along the rods 30 is provided by a piston 32 slideably extending through the yoke 31 from a fluid cylinder 33 and having its extending end attached to the peg plate 28. With control of fluid pressure within the cylinder 33 in conventional manner, the peg plate 28 is moved in a substantially horizontal plane of motion.

The yoke 31 is slideably and vertically movable along a plurality of fixedly positioned posts 34 by a piston 35 extending from a fluid cylinder 36. Thus, in that embodiment of the invention disclosed herein, vertical motion of the peg plate 28 is provided by control in conventional manner of fluid pressure within the fluid cylinder 36 so that the yoke 31 and the rods 30 are moved upwardly and downwardly to move the peg plate 28 between the upper plate 26 and the lower plate 27.

As is most clearly seen from FIG. 2, the peg plate has an upper member 37 and a lower member 38 through which a plurality of pages 39 extend and within the peg plate 28 each of the pegs 39 has an upper notch 40 and a lower notch 41 formed in its side. A plurality of leaf springs 42 are positioned within the peg plate 28 so that the end of a spring 42 is urged against the side of each peg 39 and into the upper notch 40 when the peg 39 is in its lower and operative position and into the lower notch 41 when the peg 39 is in its upper and inoperative position.

An upper collar 80 around the upper end of each of the pegs 39 prevents a peg 39 from being moved downwardly through the peg plate 28 beyond that position at which a spring 42 is in the upper notch 40 formed in the side of the peg 39. Similarly, a lower collar 81 around the lower end of each of the pegs 39 prevents a peg 39 from being moved upwardly beyond that position at which the spring 42 is in the lower notch 41 formed in the side of the peg 39. Thus, each of the pegs 39 is slideably and vertically movable within the peg plate 28 between a lower and operative position and an upper and inoperative position and with only that small amount of force required to force a spring 42 out of a notch 40 or 41 in the side of a peg 39 and to slide the peg 39 in the peg plate 28.

The pegs 39 extending through the peg plate 28 are arranged in rows and columns with the pegs 39 in a column aligned with one of the punch bars 15. Each of the punch bars 15 has an upwardly extending tab 43 at that end adjacent the peg plate 28 and it will be understood that with horizontal motion of the peg plate 28 toward the tabs 43, a tab 43 is engaged by the first peg 39 in a column of pegs 39 which is in its lower and operative position and is not engaged by those pegs 39 which are in their upper and inoperative positions. Thus, for a particular horizontal motion of the peg plate 28 relative to the punch bars 15, the motion of each punch bar 15 is dependent upon which peg 39 in a column of pegs 39 is in its operative position and is changed simply by changing the operatively positioned peg 39 in the column of pegs 39.

It will now be seen that the transducing means T converts data input in any input mode which serves to depress selectively the pegs 39 into data output in an output mode which is defined by the pegs 39 that are operatively positioned. With appropriate horizontal motion of the peg plate 28, the data output in the output mode defined by the pegs 39 in their operative positions serves to position the punch bars 15 of the punching means P for the punching of the data into a punch card 23 without regard to the input mode of the data input.

A clearing bar 44 is provided by the transducing means T to clear data from the punching means P after each data output from the transducing means T to the punching means P. The clearing bar 44 is mounted for slideable vertical movement relative to the peg plate 28 but for horizontal movement with the peg plate 28 by a channel member 45 attached to each end of the peg plate 28. The clearing bar 44 slideably rests on the upper edges of the punch bars 15 so as to place the tabs 43 between the pegs 39 and the clearing bar 44. Thus, with horizontal motion of the peg plate 28 toward the punch bars 15 for data output, the clearing bar 44 simply slides along the punch bars 15. However, with return of the peg plate 28 to a position between the upper plate 26 and the lower plate 27 after data output, the clearing bar 44 engages the tabs 43 and moves the punch bars 15 into inoperative positions at which no hammer 17 is above a punch 10.

Thus, it will be understood that horizontal motion of the peg plate 28 serves not only to position the punch bars 15 to provide data output in a single output mode defined by those pegs 39 in their operative positions but also serves to return all punch bars 15 to inoperative positions for further data output to the punching means P from the transducing means T. However, it will also be understood that the transducing means T is spaced from and operable independently of a recording means such as the punching means P so that it is easily accessible for data input in a variety of input modes.

It will be further understood that by reason of the relatively small amount of force required to depress pegs 39 for data input to the transducing means T, data input to the transducing means T may be simply in an input mode defined by manual depression of the pegs 39. However, for the same reason and because it is spaced from and operable independently of the punching means P, the transducing means T provides for data input in any one or more of the plurality of input modes by which it is desired to provide data for recording in a single punch card 23 or other record by motion of elements such as the punches 10. This will be seen from the following consideration of data input to the transducing means T from a plurality of data sources which provide data to the transducing means T in various input modes.

PERFORATED CARD

When providing data input to the transducing means T from a perforated card 46 as shown in FIG. 2, the data input to the transducing means T is in an input mode defined by the perforations 47 in the card 46. As is shown by FIG. 2, for data input in this input mode, a plurality of peg channels 48 are formed in the lower plate 27 at those positions corresponding to the possible locations of the perforations 47 in a perforated card 46. Fluid pressure in the fluid cylinder 36 is controlled in conventional manner to provide for vertical motion of the peg plate 28 between a lower position in which the pegs 39 extend into the peg channels 48 and an upper position in which the upper ends of the pegs 39 engage the upper plate 26 and are all forced into their lower and operative positions.

It will now be understood that when a perforated card 46 is placed on the lower plate 27 and the peg plate 28 is moved to its upper position to force all pegs 39 into their lower and operative positions and is subsequently moved to its lower position, those pegs 39 in the peg plate 28 which do not correspond to perforation 47 in the perforated card 46 will be urged upwardly by the perforated card 46 into their upper and inoperative positions so as to leave in their lower and operative positions only those pegs 39 which correspond to perforations 47 in the perforated card 46. Thus, when the peg plate 28 is subsequently moved horizontally relative to the punch bars 15, the tabs 43 are engaged and moved by pegs 39 which correspond in their positions to the locations of the perforations 47 in the perforated card 46. The resulting motion of the punch bars 15 serves to position hammers 17 over punches 10 in the punching means P which are in positions corresponding to the perforations 47 in a perforated card 46.

ADDING MACHINE

Figure 3:
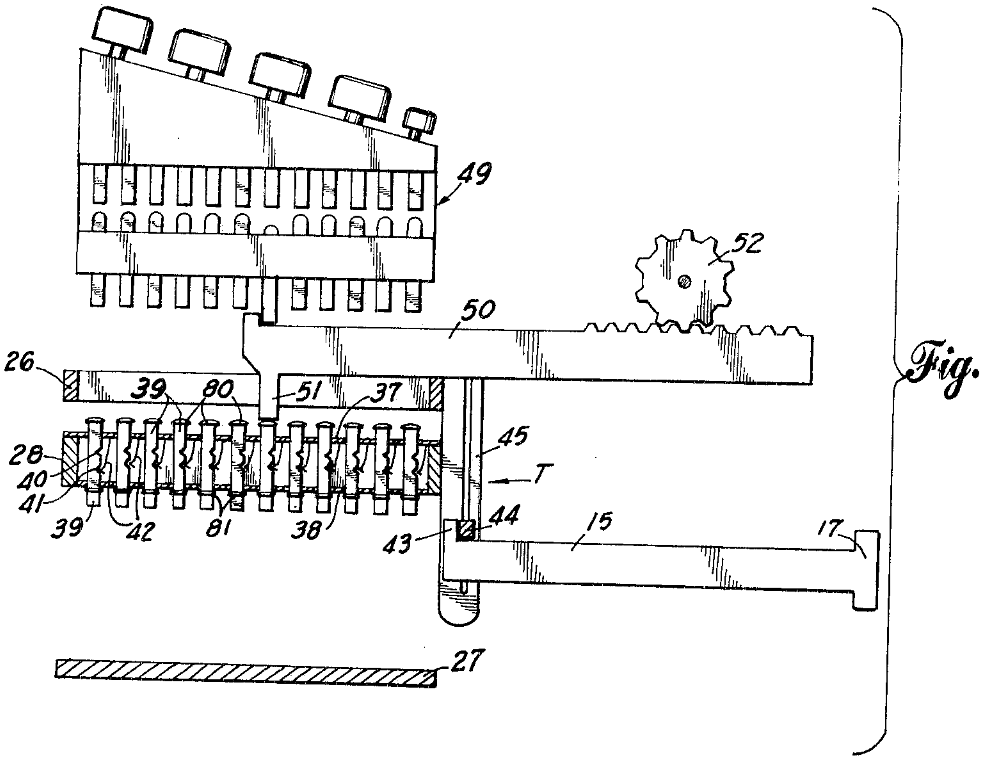
FIG. 3 is a cross-sectional view similar to FIG. 2 through a second embodiment of the invention showing data input from an adding machine.

When providing data input to the transducing means T from an adding machine 49 as shown in FIG. 3, the data input to the transducing means T is most conveniently in an input mode defined by the linear positions of the accumulating bars 50 of the adding machine 49. As is shown by FIG. 3, data input in this input mode is easily accomplished by simply positioning the adding machine 49 relative to the upper plate 26 so that a tab 51 extending from the lower side of each of the accumulating bars 50 extends through the upper plate 26 and passes over a column of pegs 39 as the accumulating bars 50 move in conventional manner in the adding machine 49.

Those skilled in the art will understand that the accumulating bars 50 rotate the register wheels 52 in the adding machine 49 and that the linear positions of the accumulating bars 50 define the data output of the adding machine 49. As a result, the positions of the tabs 51 over the pegs 39 define the data output of the adding machine 49. Thus, with control of fluid pressure in the fluid cylin-36 in conventional manner so that the peg plate 28 has a lower position in which all of the pegs 39 are forced into their upper and inoperative positions by engaging the lower plate 27 and so that the peg plate 28 has an upper position in which pegs 39 are forced to their lower end operative positions only by engaging a tab 51 extending through the upper plate 26, the subsequent horizontal motion of the peg plate 28 relative to the punch bars 15 causes the tabs 43 to be engaged and moved by pegs 39 which correspond in their positions to the linear positions of the accumulating bars 50. The resulting motion of the punch bars 15 places hammers 17 over the punches 10 in the punching means P which are in positions corresponding to the linear positions of the accumulating bars 50 in the adding machine 49.

PUSH BUTTONS

Figure 4:
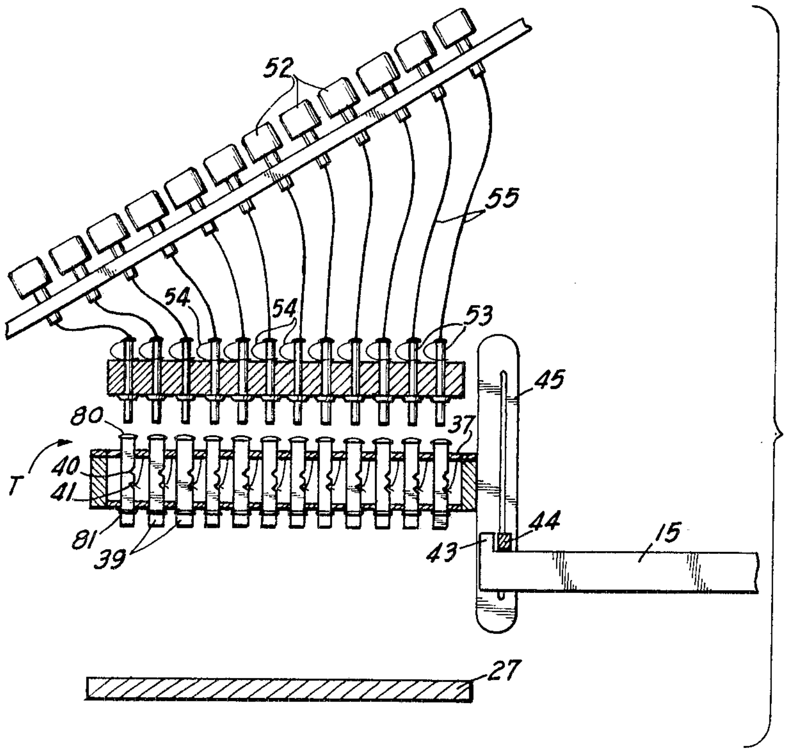
FIG. 4 is a cross-sectional view similar to FIG. 2 through a third embodiment of the invention showing data input from a plurality of push buttons.

When providing input data to the transducing means T from a plurality of push buttons 52 as shown in FIG. 4, data input to the transducing means T is in an input mode defined by the linear motion of each push button 52. As is shown by FIG. 4, data input in this input mode is achieved by simply extending a plurality of plungers 53 through the upper plate 26 at positions which correspond to the pegs 39 which are to be responsive to the depressing of the push buttons 52. Each of the plungers 53 has a normally raised position into which it is continuously urged by a spring 54 and is connected to a push button 52 by a flexible cable 55 which serves to urge a plunger 53 downwardly when a push button 52 is depressed.

It will be understood that when fluid pressure in the fluid cylinder 36 is controlled in conventional manner to provide a lower position of the peg plate 28 at which all of the pegs 39 are urged upwardly into their upper and inoperative positions by engaging the lower plate 27 and to provide an upper position of the peg plate 28 at which the downward motion of a plunger 53 in response to the depression of a push button 52 moves a peg 39 downwardly into its lower and operative position, the subsequent horizontal motion of the peg plate 28 relative to the punch bars 15 causes the punch bars 15 to be moved into positions corresponding to the punch buttons 52 depressed. Thus, the transducing means T serves to convert data input in an input mode defined by linear motion of a push button 52 into data output which places hammers 17 over punches 10 which are in positions corresponding to the push buttons 52 depressed.

ROTATING MEMBER

Figure 5:
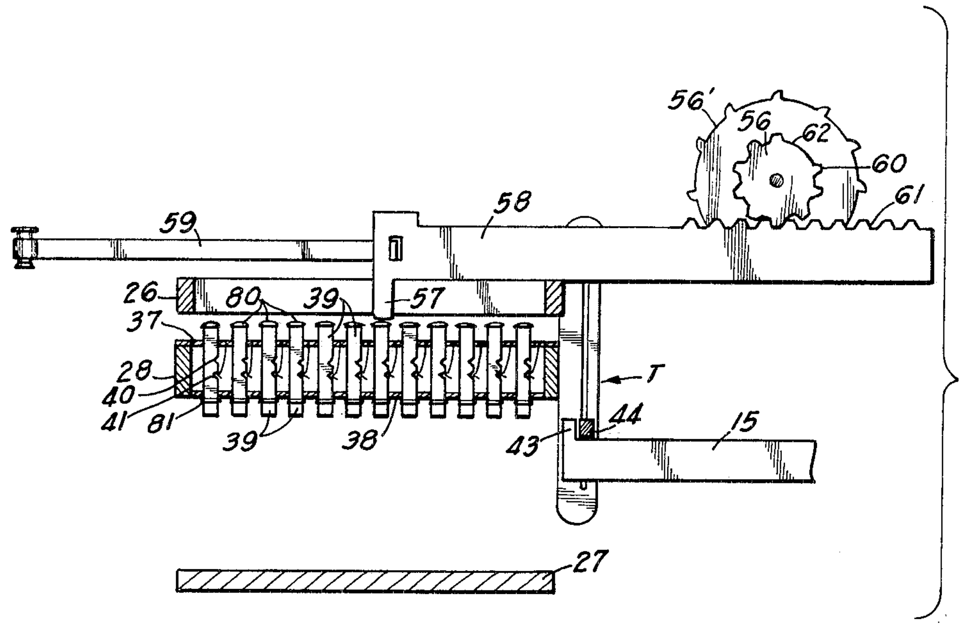
FIG. 5 is a cross-sectional view similar to FIG. 2 through a fourth embodiment of the invention showing data input from a rotating member.

When providing data input to the transducing means T from a rotating member 56 as shown in FIG. 5, data input to the transducing means T is in an input mode defined by the rotational position of the rotating member 56. As is shown by FIG. 5, data input to the transducing means T in this input mode is provided in substantially the same manner as data input from an adding machine 49. This is because it is provided simply by extending a tab 57 downwardly through the upper plate 26 from an input bar 58 moved by rotation of the roating member 56.

In FIG. 5, the input bar 58 is resiliently urged to the left by a spring 59 and is moved to the right against the action of the spring 59 by a plurality of teeth 60 in the rotating member 56 which engage a ratchet 61 formed in the upper edge of the input bar 58. It will be understood that the rotating member 56 has a zone 62 along its periphery at which there are no teeth 60 and that when the rotating member 56 is in that position at which the zone 62 is engaging the ratchet 61, the input bar 58 is pulled to the left by the spring 59 to restart its motion to the right in response to rotation of the rotating member 56.

It will also be understood that the rotating member 56 may be one of a plurality of rotating members 56 and 56' in a clock mechanism each of which positions an input bar 58 relative to the pegs 39 in the peg plate 28. In such a clock mechanism, the data input to the transducing means T corresponds to time and the data output from the transducing means T by which punch bars 15 are positioned results in a punching of a punch card 23 which is representative of time. However, regardless of the quantity to which the rotational position of a rotating member 56 is related, the transducing means T converts data input in a mode defined by the rotational position of a rotating member 56 into a data output in a mode defined by the positions of the pegs 39.

HORIZONTAL SLIDERS

Figure 6:
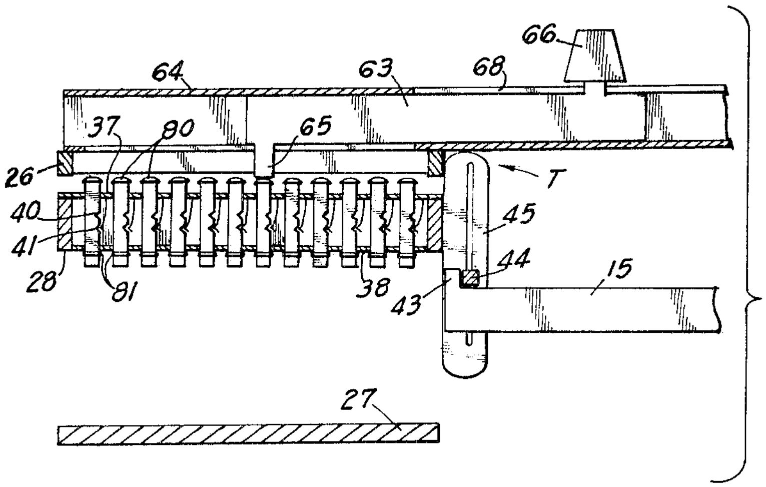
FIG. 6 is a cross-sectional view similar to FIG. 2 through a fifth embodiment of the invention showing data input from horizontal sliders.

It is frequently convenient to provide data input to the transducing means T in an input mode defined by the positions of manually positioned horizontal sliders 63 as shown by FIG. 6. Data input to the transducing means T in this input mode is similar to data input from an adding machine 49 or from a rotating member 56.

When data input in this input mode is to be provided, the sliders 63 are positioned in a slider box 64 mounted on the upper plate 26 and each of the plurality of sliders 63 has a tab 65 extending downwardly through the upper plate 26 to pass in sequence over the pegs 39 in a column of pegs 39. Attached to each of the sliders 63 is a thumb button 66 and with appropriate indicia (not shown) adjacent slots 68 in the slider box 64 through which the thumb buttons 66 extend, the sliders 63 may be placed in various selected positions to provide a data input to the transducing means T.

The positioning of the tabs 65 serves to place pegs 39 in their lower and operative positions and to provide data output to the punching means P in the manner described above with respect to the tabs 51 and 57. Thus, it will be understood that the transducing means T serves to convert data input in an input mode defined by the linear position of a horizontal slider 63 into the data output which is used for positioning the hammers 17 over the plurality of punches 10.

MULTIPLE DATA SOURCES

Figure 7:
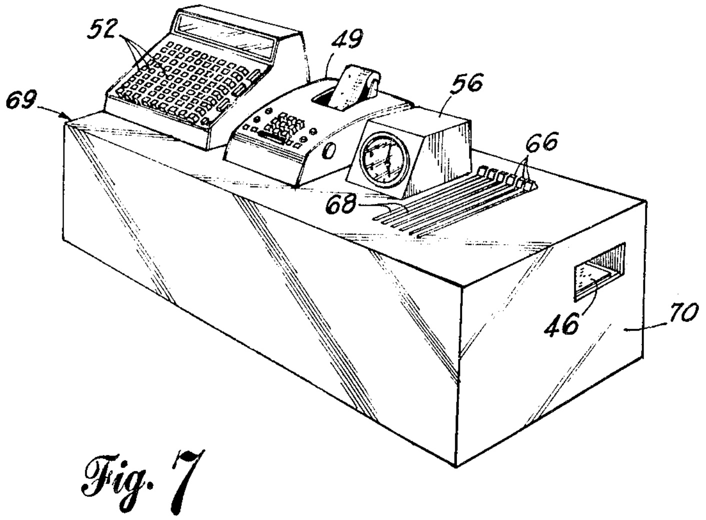
FIG. 7 is a perspective view of an embodiment of the data recording device disclosed herein which is enclosed within a cabinet and in which provision is made for data input from all of the data sources shown in FIGS. 2 through 6.

FIG. 7 is a perspective view of a data recording device 69 embodying the invention disclosed herein in which data input in each of the plurality of input modes considered above is converted by the transducing means T into data output in a single output mode defined by positions of the pegs 39. As shown in FIG. 7, the data recording device 69 includes a cabinet 70 and other structural features which are unnecessary to describe or show in detail since they will now be readily understood by those skilled in the art.

For example, FIG. 1 shows the manner in which the upper plate 26 is constructed to provide for data input from a perforated card 46 and from push buttons 52. From FIG. 1 it will be seen that in that zone of the peg plate 28 at which data input is from push buttons 52, the upper plate 26 is reduced in thickness so that depression of a push button 52 is required to move a peg 39 into lower and operative position even though all of the pegs 39 in that zone at which data input is from a perforated card 46 are moved into their lowered and operative positions by the upper plate 26 with motion of the peg plate 28 as described above. Thus, from FIG. 1 and FIG. 7, it will be readily understood that data input in each of the plurality of input modes considered herein and in terms of a variety of other input modes is provided by a single peg plate 28 by only minor changes in the upper plate 26 or in the lower plate 27 and by providing for a variety of motions of the peg plate 28 so as to provide for the motion of the peg plate 28 required for each input mode.

It is because of this that a data recording device embodying the invention disclosed herein provides a relatively inexpensive and highly flexible data recording device for recording data in punch cards or other records from data input by one or more of a wide variety of data sources. Moreover, it will now be understood that a data recording device embodying the invention is a highly durable and relatively inexpensive data recording device.

It will be obvious to those skilled in the art that many variations may be made in the embodiments chosen for the purpose of illustrating the present invention without departing from the scope thereof as defined by the appended claims.

What is claimed is:

1. In a data recording device; a transducing means for converting data input in each of a plurality of input modes into data output in a single output mode defined by the positions of a plurality of pegs; a recording means for recording data defined by said positions of said plurality of pegs, said recording means including means responsive to the positions of said plurality of pegs when said plurality of pegs are simultaneously moved relative to said recording means; and motion means for moving said plurality of pegs simultaneously relative to said recording means.

2. The device of claim 1 in which said recording means records said data by motion of a plurality of elements.

3. The device of claim 2 in which said transducing means is spaced from and operable independently of said recording means.

4. The device of claim 2 in which each of said pegs has a first position and a second position into which it is moved by said data input.

5. The device of claim 4 in which said elements are punches, in which said recording means includes a plurality of punch bars slideably positionable relative to said punches, and in which one of said pegs in said second position engages and moves one of said punch bars upon motion of said pegs by said motion means.

6. The device of claim 5 in which each of said punch bars includes a hammer selectively positionable over some of said punches.

7. The device of claim 6 in which a hammer prevents slideable motion of a punch over which said hammer is positioned.

8. The device of claim 4 including a second motion means for moving said pegs relative to a card having at least one perforation in its surface so that at least one of said pegs is placed in said perforation and others of said pegs are moved by said surface of said card.

9. The device of claim 4 including a slideable bar having a tab selectively positionable over at least some of said pegs by motion of said slideable bar, and a second motion means for moving said some of said pegs relative to said tab so that said tab moves a peg from its said first position to its said second position.

10. The device of claim 9 in which said slideable bar is slideably movable in response to rotation of a rotating member.

11. The device of claim 9 in which the position of said slideable bar is responsive to the data output of an adding machine.

12. The device of claim 9 including a second tab on each of said slideable bars extending through a slot in a box member.

13. The device of claim 4 including a plurality of push buttons, and means for operatively connecting at least one of said push buttons to one of said pegs so that motion of said one of said push buttons moves said one of said pegs from its said first position to its said second position.

14. The device of claim 1 in which said recording means records said data output in a mode different from said single output mode.

15. The device of claim 1 in which said data input in said each of a plurality of input modes is simultaneous in at least two input modes.

16. The device of claim 1 in which one of said input modes is defined by the linear position of a slideable bar.

17. The device of claim 1 in which one of said input modes is defined by the rotational position of a rotating member.

18. The device of claim 1 in which one of said input modes is a mode defined by the output of an adding machine.

19. The device of claim 1 in which one of said input modes is defined by the perforations in a card.

20. The device of claim 1 in which one of said input modes is defined by the motion of a push button.

21. In a data recording device; a transducing means for converting data input in a first mode into data output in a second mode defined by the positions of a plurality of pegs; first motion means for moving said plurality of pegs relative to a recording means for recording said data output by motion of a plurality of elements, said recording means being responsive to said positions of said plurality of pegs upon motion of said plurality of pegs by said first motion means; a slideable bar having a tab selectively positionable over at least some of said plurality of pegs by motion of said slideable bar; and second motion means for moving at least one of said plurality of pegs relative to said tab so that said tab moves said one of said plurality of pegs from a first position into a second position, said recording means being responsive to said one of said plurality of pegs in said second position upon motion of said plurality of pegs by said first motion means.

22. In a data recording device; a transducing means for converting data input in each of a plurality of input modes into data output in a single output mode defined by the positions of a plurality of pegs; means for providing each of a plurality of motions to said plurality of pegs, each of said plurality of motions being related to one of said plurality of input modes and serving to change at least one of said positions of said plurality of pegs; and recording means responsive to said positions of said plurality of pegs for recording said data output by motion of a plurality of elements.

References Cited

UNITED STATES PATENTS

| | | | |
|---|---|---|---|
| 1,680,054 | 8/1928 | Lebeis | 234—91 |
| 1,817,631 | 8/1931 | Lake et al. | 234—112 X |
| 1,969,383 | 8/1934 | Peirce | 234—112 |
| 2,085,910 | 7/1937 | Johnstone et al. | 234—112 X |
| 2,848,047 | 8/1958 | Gollwitzer | 234—112 |
| 2,998,914 | 9/1961 | Thomas et al. | 234—54 X |
| 3,006,537 | 10/1961 | Gassino et al. | 234—54 X |
| 3,135,461 | 6/1964 | Biegel | 234—85 X |
| 3,401,877 | 9/1968 | Brett et al. | 234—45 X |

FOREIGN PATENTS

| | | |
|---|---|---|
| 719,179 | 2/1932 | France. |
| 910,666 | 6/1946 | France. |

WILLIAM S. LAWSON, Primary Examiner

U.S. Cl. X.R.

234—54, 55, 65, 85, 90, 112, 114, 116, 121, 123